United States Patent
Meier et al.

(10) Patent No.: US 9,546,603 B2
(45) Date of Patent: Jan. 17, 2017

(54) ENGINE SYSTEMS AND METHODS FOR REMOVING PARTICLES FROM TURBINE AIR

(71) Applicant: HONEYWELL INTERNATIONAL INC., Morristown, NJ (US)

(72) Inventors: John Meier, Phoenix, AZ (US); Daniel C. Crites, Mesa, AZ (US); Yogendra Yogi Sheoran, Scottsdale, AZ (US); Mark C. Morris, Phoenix, AZ (US); Jeff Howe, Chandler, AZ (US); Ardeshir Riahi, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 328 days.

(21) Appl. No.: 14/244,219

(22) Filed: Apr. 3, 2014

(65) Prior Publication Data

US 2015/0354461 A1    Dec. 10, 2015

(51) Int. Cl.
*F02C 7/30* (2006.01)
*F02C 7/18* (2006.01)
(Continued)

(52) U.S. Cl.
CPC .............. *F02C 7/30* (2013.01); *F01D 5/081* (2013.01); *F01D 9/065* (2013.01); *F01D 25/32* (2013.01);
(Continued)

(58) Field of Classification Search
CPC .............. F02C 6/06; F02C 6/08; F02C 7/12; F02C 7/18; F02C 7/185; F02C 7/30; F02C 7/052; F05D 2260/95; F01D 5/081; F01D 5/082; F01D 5/085; F01D 5/087; F01D 9/065; F01D 25/32; F01D 25/007; F01D 25/12
See application file for complete search history.

(56) References Cited

U.S. PATENT DOCUMENTS 3,668,835 A * 6/1972 Vicard .................... B03C 3/36
                                                261/116
6,527,829 B1 * 3/2003 Malkamaki ........... B03C 3/017
                                                55/DIG. 38
(Continued)

FOREIGN PATENT DOCUMENTS

EP    2006511 A2    12/2008
EP    2305963 A2    4/2011
EP    1232013 B1    7/2013

OTHER PUBLICATIONS

Wallis Harrison et al., Results of the Indigo Agglomerator Testing At Watson Power Station, May 6, 2004.
Extended EP Search Report for Application No. 15160109.3-1610 dated Jul. 31, 2015.

*Primary Examiner* — Andrew Nguyen
(74) *Attorney, Agent, or Firm* — Lorenz & Kopf, LLP

(57) ABSTRACT

A cooling arrangement is provided for a gas turbine engine with a turbine section. The cooling arrangement includes a first conduit to receive cooling air that includes particles; a separator system coupled to the first conduit to receive the cooling air and configured to remove at least a portion of the particles to result in relatively clean cooling air and scavenge air including the portion of the particles; and a second conduit coupled to the separator system and configured to direct the relatively clean cooling air to the turbine section.

12 Claims, 6 Drawing Sheets

(51) Int. Cl.
  *F02C 3/04* (2006.01)
  *F01D 25/32* (2006.01)
  *F02C 7/052* (2006.01)
  *F01D 5/08* (2006.01)
  *F01D 9/06* (2006.01)
  *F04D 29/44* (2006.01)

(52) U.S. Cl.
  CPC .............. *F02C 3/04* (2013.01); *F02C 7/052* (2013.01); *F02C 7/18* (2013.01); *F04D 29/441* (2013.01); *F05D 2220/32* (2013.01); *F05D 2260/232* (2013.01); *F05D 2260/95* (2013.01); *Y02T 50/673* (2013.01); *Y02T 50/676* (2013.01)

(56) References Cited

U.S. PATENT DOCUMENTS

| | | | | |
|---|---|---|---|---|
| 7,300,496 B2* | 11/2007 | Taylor | ............... | B03C 3/06 95/58 |
| 2007/0235373 A1* | 10/2007 | Strangman | ............ | F04D 29/441 209/580 |
| 2008/0041064 A1* | 2/2008 | Moore | ................ | F01D 5/081 60/782 |
| 2008/0112794 A1* | 5/2008 | Lee | ................... | F01D 5/189 415/115 |
| 2009/0285680 A1* | 11/2009 | Hess | ................. | F01D 5/081 416/1 |
| 2014/0190347 A1* | 7/2014 | Wong | ................. | F01D 25/002 95/65 |

* cited by examiner

ENGINE SYSTEMS AND METHODS FOR REMOVING PARTICLES FROM TURBINE AIR

TECHNICAL FIELD

The present invention generally relates to vehicular engines, and more particularly relates to methods and systems for removing particles from air flowing through vehicular engines, including the turbine sections of aircraft engines.

BACKGROUND

Aircraft engines are used for a number of purposes, including propulsion and/or driving various other components with electrical, pneumatic, and/or hydraulic power. Generally, a gas turbine engine includes a compressor section, a combustion section, and a turbine section. During operation, the compressor section draws in ambient air, compresses the air with one or more compressors, and supplies the compressed air to the combustion section. In addition to the compressed air, the combustion section receives fuel via a fuel injection assembly, mixes the fuel with the compressed air, ignites the mixture, and supplies the high energy combustion gases to the turbine section to drive one or more turbines, including a shaft that may be used to drive the compressor and other components.

During operation, the ambient air drawn into the engine may contain undesirable particles, such as sand and dust, that may cause issues for engine components. In order to prevent such issues, at least a portion of the undesirable particles are removed from the air using an inlet particle separator, such as an inertial inlet particle separator arranged an inlet portion of the engine. Typically, inlet particle separators attempt to separate the clean air, which is guided into the engine, from the contaminated air with the particles, which is discharged.

Although some inlet particle separators are successful in providing relatively clean air to the engine, it may be challenging to efficiently remove particles, particularly small or fine particles. If unaddressed, insufficient removal of fine particles may lead to erosion, obstruction, or glassing issues. This may be a particularly relevant issue in the turbine section of the engine in which cooling arrangements include small holes and passages that may be subject to blockage.

Accordingly, it is desirable to provide improved methods and systems for separating particles from air flows in a vehicular engine, particularly for small particles. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a cooling arrangement is provided for a gas turbine engine with a turbine section. The cooling arrangement includes a first conduit to receive cooling air that includes particles; a separator system coupled to the first conduit to receive the cooling air and configured to remove at least a portion of the particles to result in relatively clean cooling air and scavenge air including the portion of the particles; and a second conduit coupled to the separator system and configured to direct the relatively clean cooling air to the turbine section.

In accordance with another exemplary embodiment, an engine assembly is provided. The engine assembly includes a compressor section configured to receive and compress air; a combustion section coupled to the compressor section and configured to combust at least a portion of the compressed air to result in combustion gases; a turbine section coupled to the combustion section and configured to receive the combustion gases to generate power; and a cooling arrangement configured to direct cooling air to the turbine section. The cooling arrangement includes a separator system configured to remove a portion of particles from the cooling air to result in relatively clean cooling air and scavenge air including the portion of the particles.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Embodiments described herein provide particle separator systems and methods for separating particles from cooling air supplied to a turbine section. Particularly, the separator systems and methods include an electrostatic device that applies a charge to the particles such that the particles migrate to a collector unit that removes the charged particles to result in relatively clean air flow and relatively dirty air flow. The relatively clean air is directed to the turbine section, such as to a tangential on-board injector (TOBI) system for cooling the rotor assemblies or a circuit for cooling the stator assemblies. The relatively dirty air is discharged.

Figure 1:
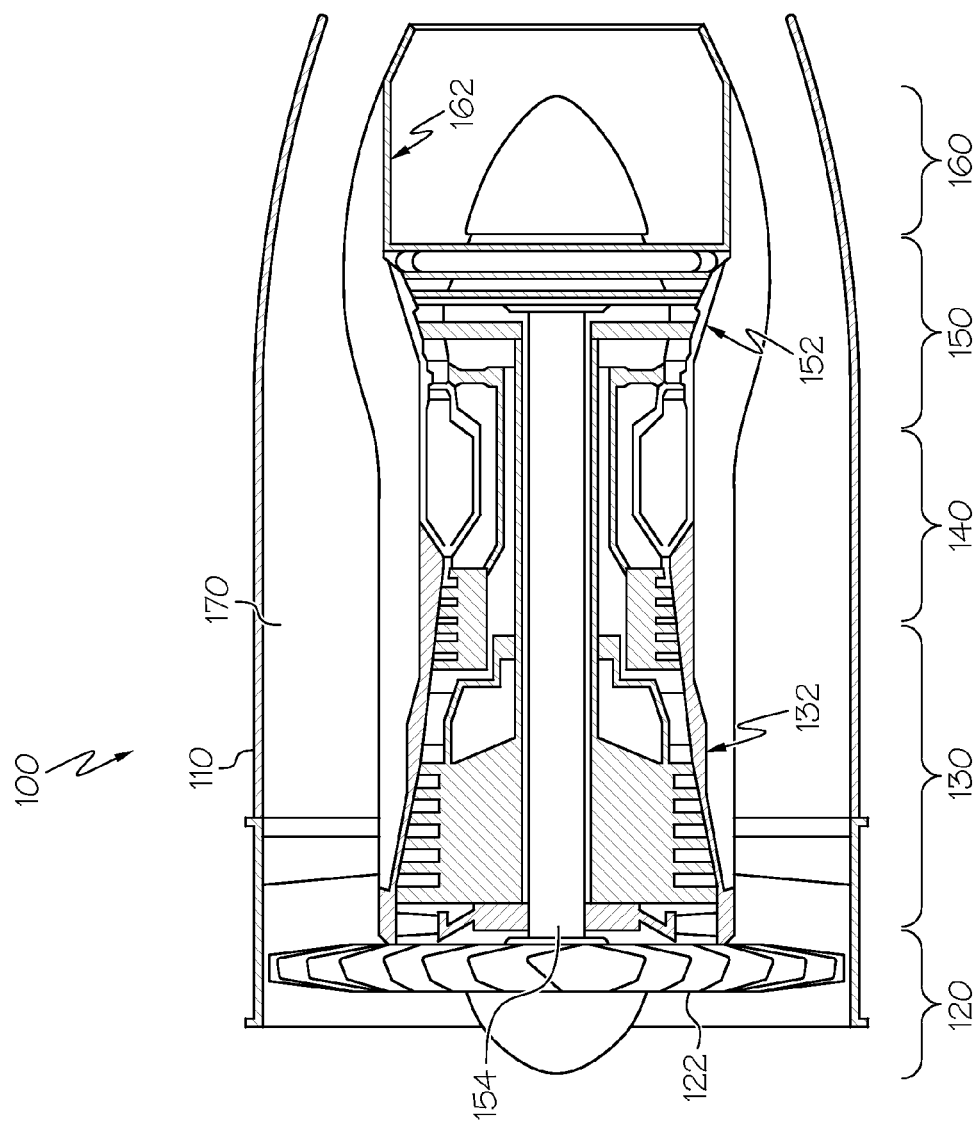
FIG. 1 is a schematic cross-sectional view of a gas turbine engine in accordance with an exemplary embodiment.

FIG. 1 is a simplified, cross-sectional view of a gas turbine engine 100 according to an exemplary embodiment. The engine 100 may be, for example, a turbine engine of an aeronautical vehicle such as a helicopter or fixed wing vehicle. As examples, the engine 100 may be an auxiliary power unit (APU), a turboshaft, or a turbofan engine.

The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132, which raise the pressure of the air directed into it from the fan 122. The compressors 132 may direct the compressed air into the combustion section 140. The compressor section 130 may be implemented as any one of numerous types of compressors, including centrifugal compressors. As described in greater detail below, the compressor section 130 may supply cooling air to a cooling arrangement.

In the combustion section 140, the high pressure air is mixed with fuel via a fuel injection assembly and combusted to produce relatively high-energy combustion gas. The combusted air is then directed into the turbine section 150. The combustion section 140 may be implemented as any one of numerous types of combustors, including various can-type combustors, various reverse-flow combustors, various through-flow combustors, and various slinger combustors.

The turbine section 150 may include a series of turbines 152 disposed in axial flow series. The combusted air from the combustion section 140 expands through and rotates the turbines 152. The air is then exhausted through a propulsion nozzle 162 disposed in the exhaust section 160, thereby providing additional forward thrust. In one embodiment, the turbines 152 rotate to thereby drive equipment in the engine 100 via concentrically disposed shafts or spools. Specifically, the turbines 152 may drive the compressor 132 via one or more rotors.

Accordingly, during operation, the engine 100 receives air from the atmosphere to accomplish various functions, including mainstream gas flow to support engine operation in the form of compression, combustion, and power extraction discussed above. Other functions may include providing compressed air to various vehicle systems, and as discussed below, as cooling air to portions of the engine 100. Under certain operating conditions, the air passing through the engine 100 may include dirt, dust, sand, and other solid particles suspended therein. Such particles may cause issues within the engine, including diminished performance and accelerated wear on the engine components.

In some engines, an inlet particle separator system (not shown) is provided to receive the inlet air upstream of the compressor section 130, separate the particles from relatively clean air, which is subsequently compressed in the compressor section 130, and remove the particles in the form of scavenge air exhausted into the atmosphere. In the exemplary embodiments discussed below, certain portions of the air flowing through the engine 100 may be subject to further cleaning. As an example and as discussed below, a portion of the air from the compressor section 130 designated for cooling areas of the turbine section 150 may be subject to additional particle separation. Such particle separator systems are introduced below in reference to FIG. 2 and discussed in greater detail below.

Figure 2:
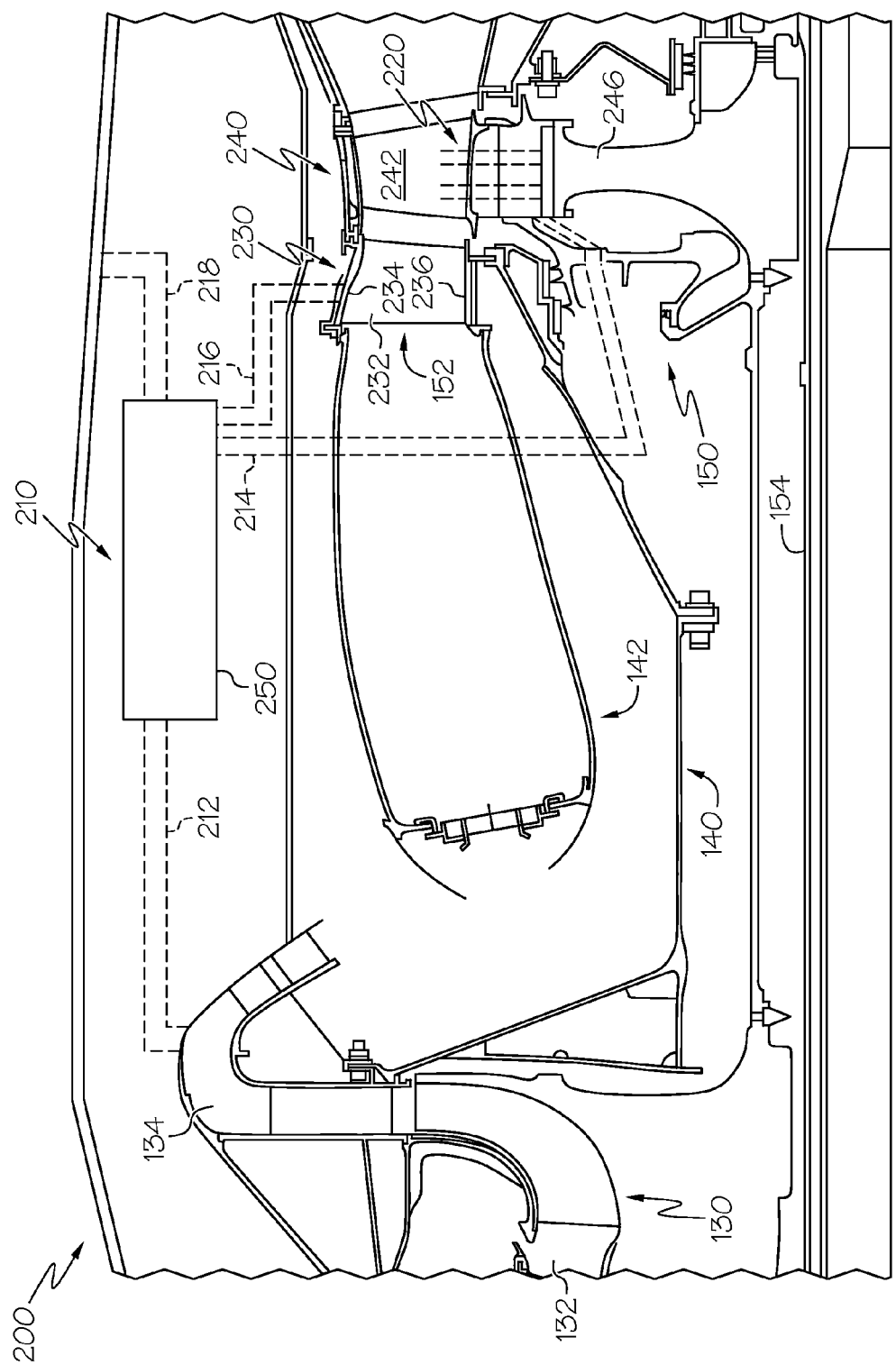
FIG. 2 is a partial cross-sectional view of an engine assembly of the gas turbine engine of FIG. 1 in accordance with an exemplary embodiment.

FIG. 2 is a partial cross-sectional view of an engine assembly 200 of the gas turbine engine 100 of FIG. 1 in accordance with an exemplary embodiment. Generally, the view of FIG. 2 depicts portions of the compressor section 130, the combustion section 140, and the turbine section 150 that may be incorporated into the engine 100 discussed above. As such, FIG. 1 will also be referenced in the discussion below.

As shown in FIG. 2, the engine assembly 200 includes portions of the compressor 132 of the compressor section 130. A diffuser 134 is positioned downstream of the compressor 132 to receive the compressed air and direct the compressed air into the combustion section 140. As discussed above, the combustion section 140 includes a combustor 142 in which the compressed air is mixed with fuel and ignited. The resulting combustion gases are directed into the turbine section 150. As also discussed above, the turbine section 150 includes one or more turbines 152 for extracting power from the combustion gases. In particular and as shown, the turbines 152 may include circumferential rows of stator and rotor assemblies 230, 240. The stator assembly 230 (one of which is shown) includes a number of stationary vanes 232 (one of which is shown) extending between end walls 234, 236 that form a portion of the gas path. The air flows through the stator assemblies 230 and impinge upon the rotor assemblies 240. Each rotor assembly 240 (one of which is shown) includes a circumferential row of rotor blades 242 (one of which is shown) mounted on a turbine disk 246, which in turn is coupled to the engine shaft 154. The rotor blades 242 may be, for example, high pressure turbine (HPT) blades with internal cooling, as described below. As the air impinges on the rotor blades 242, the resulting rotation drives the engine shaft 154.

Considering the high temperature of the combustion gases during operation, the engine 100 may employ one or more cooling arrangements. In particular, the engine assembly 200 includes a cooling arrangement 210 in which air is removed from the compressor section 130 and directed to portions of the turbine section 150. As described below, the cooling arrangement 210 includes at least conduits 212, 214, 216, 218. As also described below, the cooling arrangement 210 further includes a separator system 250 for removing particles from the cooling air. The cooling arrangement 210 may include any suitable combination of conduits and flow components to direct cooling air to the turbine section 150.

As schematically depicted in FIG. 2, the cooling arrangement 210 includes a first conduit 212 coupled to the compressor section 130. Although FIG. 2 depicts the conduit 212 extending from diffuser 134, any suitable bleed location in the compressor section 130 may be selected. In some exemplary embodiments, the first conduit 212 may additionally or alternatively remove air from the combustor plenum to use as cooling air.

As also shown, the separator system 250 is incorporated into the cooling arrangement 210. As described in greater detail below, the separator system 250 may receive the cooling air from the compressor section 130, e.g., via the first conduit 212, and remove at least a portion of the particles from the cooling air. The relatively clean air is directed to the turbine section 150, e.g., via conduits 214, 216, and the relatively dirty air with the particle material is directed overboard, or to a downstream (lower pressure) gas path station to produce work in the turbine, e.g. via a conduit 218. Additional details about the separator system 250 will be provided below with reference to FIGS. 3-6.

Second and third conduits 214, 216 are also schematically depicted in FIG. 2. Conduit 214 directs air from the first conduit 212 to the rotor assembly 240. In particular, the rotor assembly 240 may include internal passages 220 for distributing the cooling air to predetermined portions of the rotor assembly 240. The conduit 214 and/or internal passages 220 may form part of a tangential on-board injector (TOBI) system. As such, the internal passages 220 may include the disk slots formed between the rotor blade 242 and turbine disk 246 and extend through the rotor blades 242. As noted above, the internal passages 220 may form part of the cooling circuit for HPT blades.

Conduit 216 directs air to the stator assembly 230. In one exemplary embodiment, the conduit 216 may direct cooling air to the end walls and internal passages of the stator assembly 230, as well as portions of the shroud assembly and other turbine areas. Generally, one or more of the conduits 214, 216 may be omitted and/or direct cooling air to other portions of the turbine section 150. As noted above, the exemplary embodiment depicted in FIG. 2 is one possible configuration.

Although not shown, the cooling arrangement 210 may include a cooling unit for actively lowering the temperature of the cooling air. In one exemplary embodiment, the cooling unit may be omitted, considering that the air removed from the compressor section 130 is at much lower temperatures than the mainstream air flowing from the combustion section 140 to the turbine section 150.

As a result of this arrangement, the cooling air provided to the turbine section is further cleaned with respect to particles, particularly fine particles. Considering the relatively small cooling holes and passages that may form part of the turbine cooling arrangement, the separator system 250 may be especially beneficial. One particular benefit of the separator system 250 is that fine particles can be removed from the cooling air with low pressure drops compared to filter materials, and the pressure drop does not significantly increase with use. Aerodynamic inertial and centrifugal separators are not capable of removing the fine particles due to the drag forces being higher than the centrifugal forces in these types of systems. Pressure drop is undesirable and sometimes unacceptable, particularly for film cooled turbine components with minimal back flow margin between the turbine airfoil internal cooling air pressure and the hot free stream gas pressure at the exit of the turbine airfoil cooling holes which exit into the hot flow path. If the flow path hot gas pressure is higher than the pressure feeding the airfoil cooling holes inside the airfoil, hot gas ingestion may occur, which is undesirable with respect to the turbine component.

Figure 3:
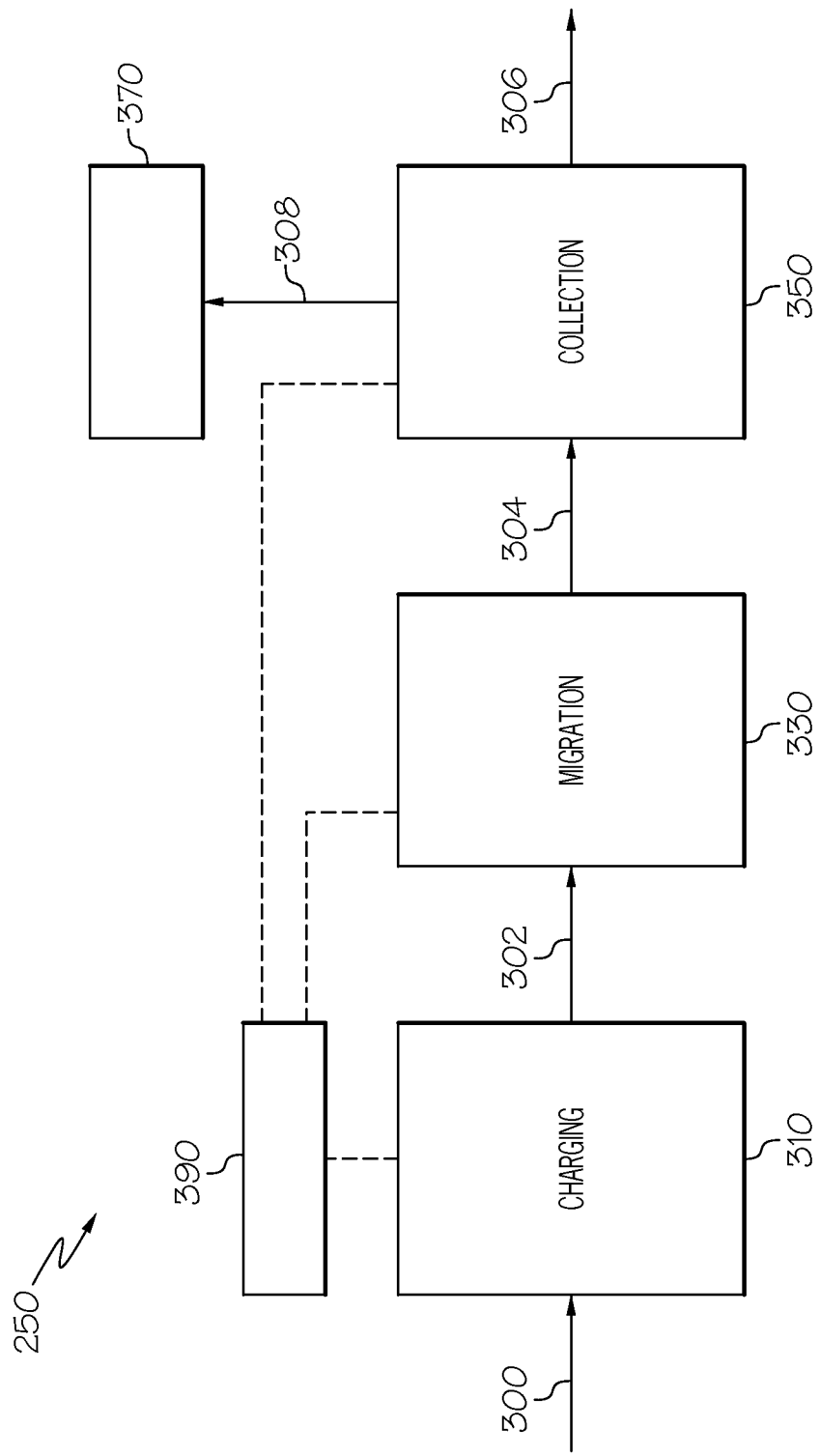
FIG. 3 is a block diagram of a particle separator system for removing particles from cooling air in the engine assembly of FIG. 2 in accordance with an exemplary embodiment.

The separator system 250 of the cooling arrangement 210 will now be discussed in greater detail. FIG. 3 is a block diagram of the separator system 250 in accordance with an exemplary embodiment. As referenced above, the separator system 250 functions to remove particles from cooling air directed to portions of the turbine section. Generally, the separator system 250 includes a charging unit 310, a migration unit 330, and a collection unit 350. The separator system 250 may further include a disposal unit 370 and a controller 390. Each unit will be described below prior to more detailed examples of the charging, migration, and collection units.

As described in greater detail below, the charging unit 310 receives the cooling air (referenced as arrow 300) with the undesirable particles and applies an electrostatic charge to the particles. The air with charged particles (referenced as arrow 302) then flows to the migration unit 330 in which the movements of the particles are manipulated based on the electrostatic charges. In particular, the charged particles may be aggregated into larger particles and/or directed in a particular direction for subsequent collection, e.g., attracted or repelled based on charge in a particular direction for collection. From the migration unit 330, the particles (referenced as arrow 304) are then collected as scavenge or dirty air in the collection unit 350, and thus, separated from the relatively clean air (referenced as arrow 306). As referenced above, the clean air 306 is used as cooling air for portions of the turbine section, and the dirty air with particles (referenced as arrow 308) is removed from the separator system 250 via the disposal unit 370, typically by dumping the particles overboard or to a station downstream within the engine that will not be detrimentally affected by the particles. The units 310, 330, 350, 370 may take any suitable form and exemplary embodiments are described below. Disposal of the particulates collected in the disposal unit 370 may be accomplished with any suitable means, depending on the application. In one embodiment, the disposal unit 370 may be purged at periodic maintenance intervals. The purge may be accomplished by physically removing the disposal unit 370, by hydraulic flushing of the disposal unit 370, or by pneumatic flushing of the disposal unit 370. In another embodiment, the disposal unit 370 may undergo continual purging, where the particulates are bled off with a small amount of bleed air. The bleed air and particulates may be disposed overboard, disposed into a fan bypass duct, fed back into downstream stages of the engine to cool components that are not distressed by particulates, or introduced back into the gas path to allow work extraction from downstream turbine stages. In yet another embodiment, the disposal unit 370 may be periodically purged during engine operation with a remote bleed solenoid, or similar device.

In some embodiments, the separator system 250 may include one or more controllers 390 to control operation of the units 310, 330, 350, 370. For example, in one exemplary embodiment, the controller 390 includes or otherwise operates an ionization control circuit for the charging unit 310 to apply the appropriate charges to the particles. As a further example, the controller 390 includes or otherwise operates a voltage control circuit for the migration unit 330 to prevent or mitigate sparking. The voltage characteristics and system configuration may be based on a number of factors. Such factors may include, for example, inlet air composition, humidity, and desired engine air flow characteristics and requirements. In general, high voltage provides a higher repulsion effect, although excessive voltages may result in arcing across electrodes. The controller 390 may also provide actuation and flow control within the separator system 250.

In one exemplary embodiment, the separator system 250 may operate during all engine conditions. In other exemplary embodiments, the exemplary embodiment, the separator system 250 may be electrically actuated by the controller 390, either automatically and/or based on pilot commands, to selectively activate or deactivate separation. For example, the separator system 250 may be selectively activated to operate only during flight conditions that result in ingestion of smaller particles. Although not shown, sensors may be implemented along a flow path to provide a closed loop feedback to a controller for adjustment and actuation of the separator system 250.

The controller 390 may be implemented in a wide variety of platforms, such as a computer system that includes a processor, an interface, a storage device, a bus, and a memory that stores executable instructions. The controller 390 may be implemented as a separate controller or as part of an overall vehicle control, navigation, avionics, communication or diagnostic system.

As such, the separator system 250 uses electrostatic charges to assist in the removal of particles from cooling air for the turbine section 150. Specific arrangements of separator systems 250 are discussed below as examples.

Figure 4:
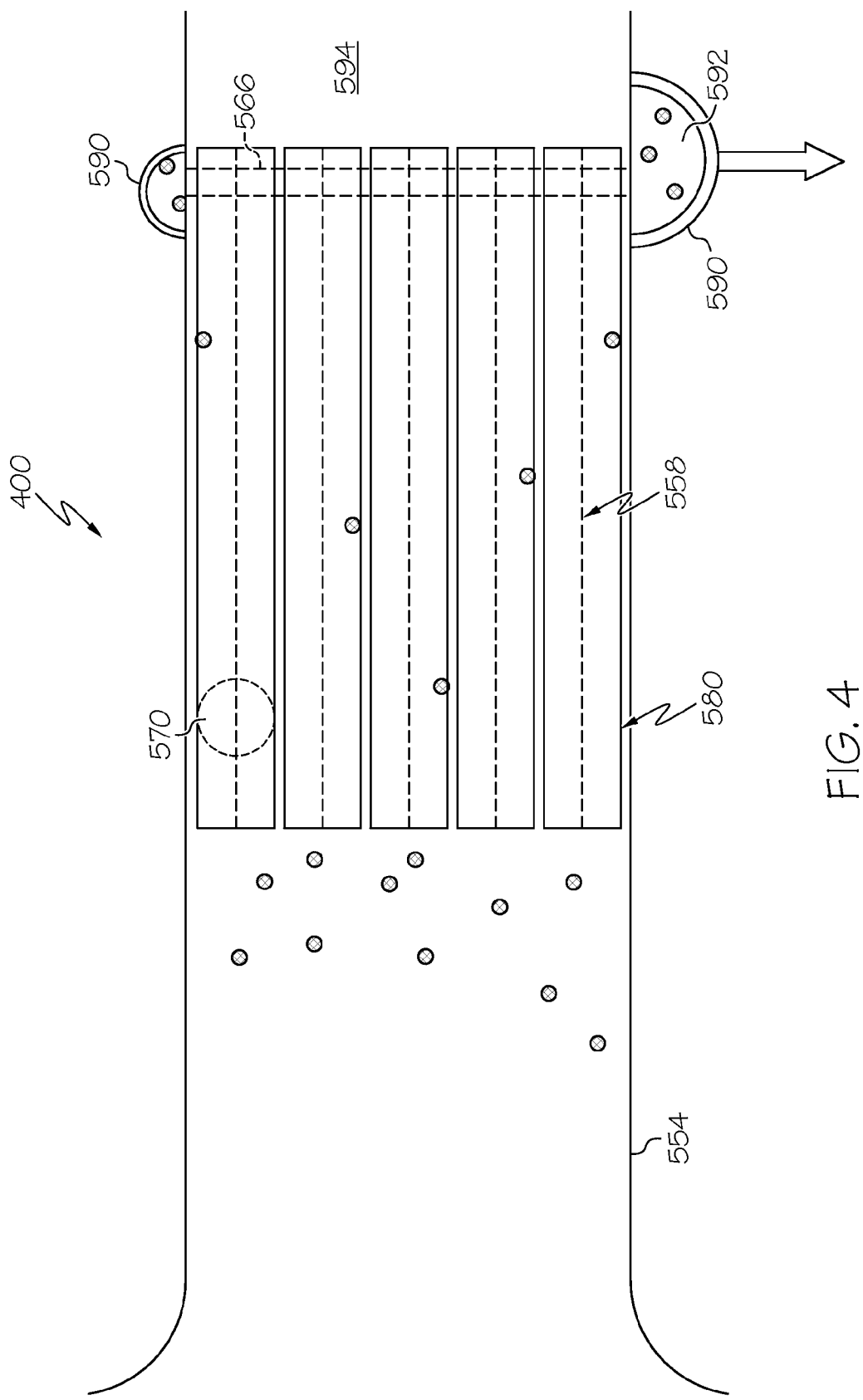
FIG. 4 is a partial schematic cross-sectional view of the particle separator system of FIG. 3 in accordance with an exemplary embodiment.
Figure 5:
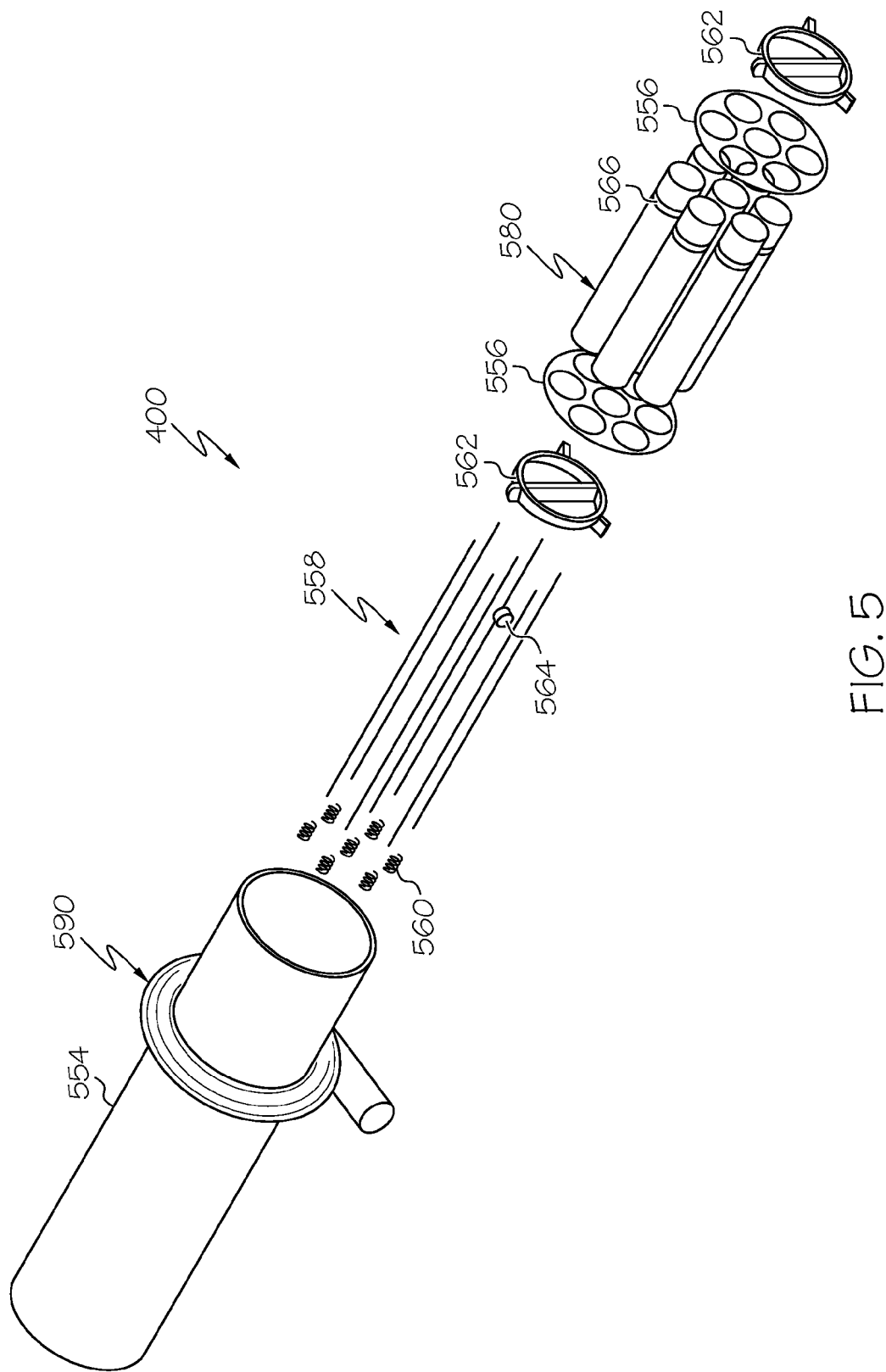
FIG. 5 is a partial isometric, exploded view of the particle separator system of FIG. 4 in accordance with another exemplary embodiment.

FIG. 4 is a schematic cross-sectional view of a separator system 400 in accordance with an exemplary embodiment. As an example, the separator system 400 may correspond to the separator system 250 discussed above, and as such, includes charging, migration, and collection units. In this exemplary embodiment, the charging, migration, and collection units all have been integrated into a relatively compact electrostatic device. Reference is briefly made to FIG. 5, which is an isometric exploded view of the separator system 400 of FIG. 4. Alternate embodiments may have different configurations to that of FIGS. 4 and 5.

Referring to FIG. 5, the separator system 400 includes one or more electrostatic tubes 580 arranged within an outer tube or housing 554. The electrostatic tubes 580 are secured within the outer tube or housing 554 with face sheets 556. An electrode 558 extends through each of the electrostatic tubes 580 in a longitudinal or axial direction. The electrodes 558 are secured and positioned by springs 560 and electrode holders 562. A voltage connector 564 is electrically coupled to apply a voltage to each electrode 558 from a voltage source (not shown). As also shown in FIG. 5 and described in greater detail below, each electrostatic tube 580 may have one or more apertures 566 that cooperate with collection unit 590 to remove scavenge air and particles from the respective electrostatic tube 580. In some embodiments, one or more apertures 566 may cooperate with a scoop or baffle to assist in the removal function. Although FIG. 4 and FIG. 5 describe charged electrostatic tubes 580, other suitable embodiments may be utilized such as charged concentric tubes, charged fins, charged grids, or charged rods.

Referring again to the separator system 400 of FIG. 4, during operation, voltage is applied to the electrodes 558 to create an ionized flow area 570 within the electrostatic tubes 580 to function as the electrostatic charging unit. As the particles flow through the tubes 580, the particles collide with moving electrons and ions within the ionized flow area 570 to acquire an electric charge. The electric charge may be positive or negative. The electrostatic tubes 580 may have a length sufficient to ensure that the particles are adequately charged.

Upon obtaining a charge, the particles will move away from the electrode 558 towards the edges of the electrostatic tubes 580 to function as the migration unit. The electrostatic tubes 580 may be grounded or of opposite polarity from the electrodes 558 to facilitate migration of the particles. As the particles move towards the walls of the electrostatic tubes 580, the particles may be collected along the edges and flow through apertures 566. The apertures 566 are fluidly coupled to the collection unit 590. Although FIGS. 4 and 5 depict apertures 566 in the walls of the tubes 580, any suitable mechanism for scrubbing and evacuating the accumulated particles along the walls of the tubes 580 may be provided.

In this embodiment, the collection unit 590 includes a scavenge conduit 592 that directs the particles to a discharge outlet (not shown). The collection unit 590 may have any suitable configuration, although in one exemplary embodiment, the collection unit 590 is configured as a scroll or partial scroll. The cleaner air tends to flow through the electrostatic tubes 580 and through an outlet 594, thereby resulting in a separation of the inlet air into the scavenge air and the clean air. In general, the particles in the electrostatic tubes 580 are collected as a result of the repulsion from the electrodes 558, although in other embodiments an opposing charge may be used to attract charged particles. In general, the scavenge air may be removed by ejector, motorized fans, or pressures lower than that of the electrostatic tubes 580.

Although not shown, the separator system 400 may include a liquid injection system that introduces an atomized or diffused liquid into the flow path or upstream of the flow path to facilitate the separation by clustering particles as a result of the cohesion or adhesion effect of the liquid, thereby enabling easier collection. As an additional benefit, diffused liquid may result in an evaporative cooling effect to reduce the temperature of the resulting cooling air.

Figure 6:
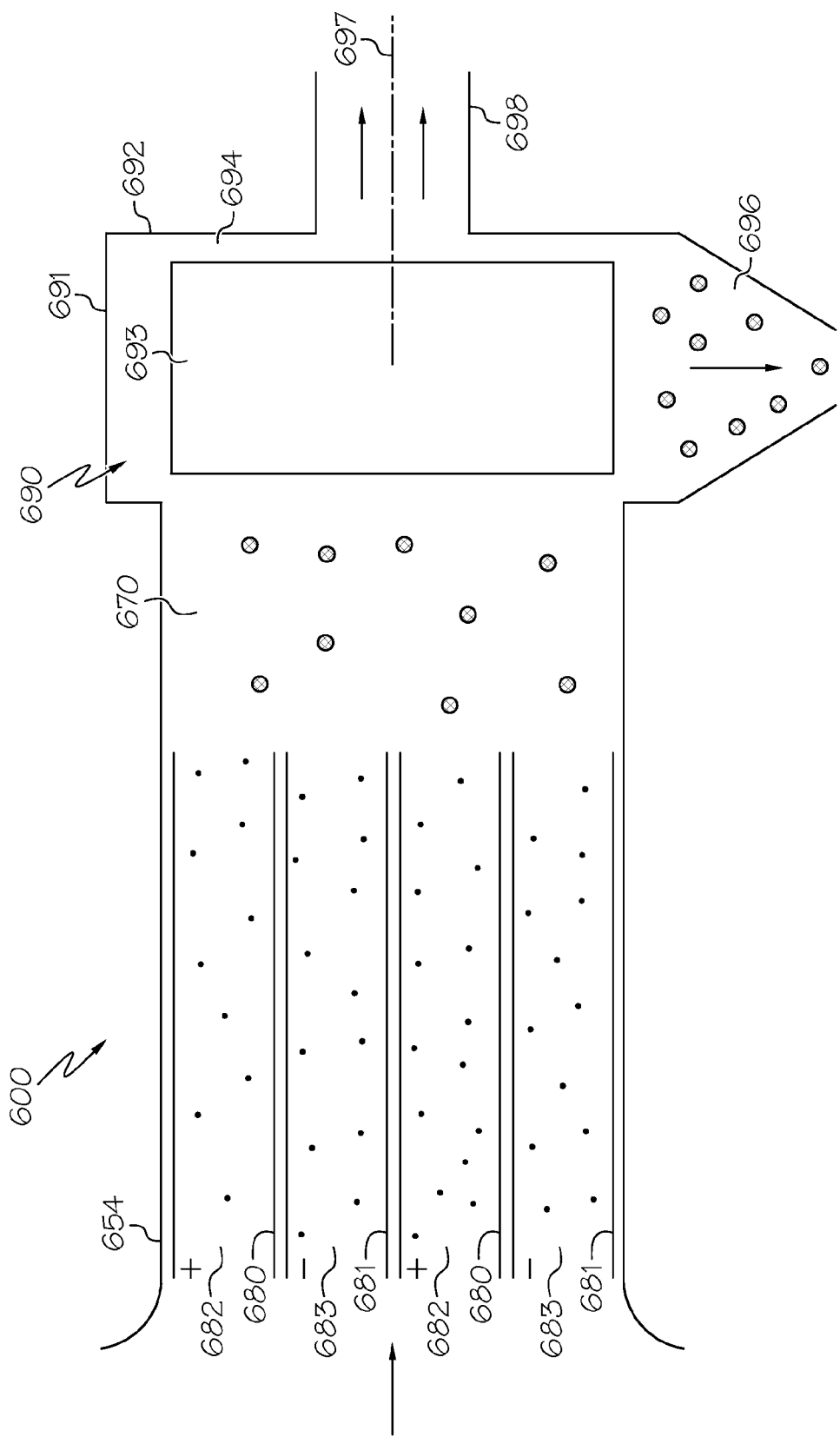
FIG. 6 is a partial schematic cross-sectional view of the particle separator system of FIG. 3 in accordance with another exemplary embodiment.

FIG. 6 is a schematic cross-sectional view of a separator system 600 in accordance with another exemplary embodiment. As an example, the separator system 600 may correspond to the separator system 250 discussed above, and as such, includes charging, migration, and collection units. In this exemplary embodiment, the charging, migration, and collection units have been integrated into another relatively compact electrostatic device.

In this exemplary embodiment, the electrostatic device 600 includes one or more electrostatic tubes 680, 681 arranged within an outer tube or housing 654. The electrostatic tubes 680, 681 form or are otherwise coupled to electrodes such that, upon application of a voltage, ionized flow areas 682, 683 are created within the respective tubes 680, 681. In one exemplary embodiment, a first set of tubes 680 creates positively charged ionized flow areas 682, and a second set of tubes 681 creates negatively charged ionized flow areas 683. As shown, the tubes 680, 681 are arranged such that the respective charge of adjacent tubes is alternated.

During operation, air with the particles flow into the housing 654 and into a respective tube 680, 681. As the particles flow through the tubes 680, 681, the particles collide with moving electrons and ions within the ionized flow area 682, 683 to acquire an electric charge. The electric charge may be positive or negative, depending on the tube 680, 681. The electrostatic tubes 680, 681 may have a length sufficient to ensure that the particles are adequately charged. In an alternate exemplary embodiment, the tubes 680, 681 may be charged with alternating current such that each tube 680, 681 creates ionized flow areas 682, 683 with both positively and negatively charged particles.

Downstream of the tubes 680, 681, the housing 654 forms a coalescing segment 670. As the particles flow from the tubes 680, 681, various particles have opposing charges. In the coalescing segment 670, particles with opposite charges tend to aggregate into larger particles. The coalescing segment 670 has a length sufficient such that the particles with opposite charges aggregate with one another.

The coalescing segment 670 is fluidly coupled to a swirl collector 690. The swirl collector 690 may comprise a scroll shape to facilitate centrifugal separation of the particle-laden air stream. The swirl collector 690 generally includes a cylindrical housing 692 and a baffle 693 arranged within the housing 692 that forms a swirl chamber 694 with the housing 692. The housing 692 further defines or is otherwise coupled to a collection chamber 696 and an air outlet 698.

During operation, the aggregated particles from the coalescing segment 670 flow into the swirl chamber 694. The air flows around baffle 693 within the swirl chamber 694, which induces swirl to the particle-laden air stream. The baffle 693 and swirl chamber 694 may comprise any suitable aerodynamic design to impart sufficient swirl to the air stream to centrifugally separate the aggregated particles along the outer wall 691 of the swirl collector 690, where the particles are collected in the collection chamber 696 and removed. The relatively clean air in the swirl chamber 694 is then directed away from the swirl collector outer wall 691 towards the centerline 697 of the swirl collector 690, where it flows from the swirl chamber 694 and exits out of the device through outlet 698. As noted above, the air flowing through the outlet 698 is used for cooling. Although one example of a swirl collector 690 is shown, any suitable swirl or inertial removal arrangement for collecting the particles may be provided.

Accordingly, separator systems for removing particles from turbine cooling air are provided. The separator systems discussed above may be used independently or in conjunction with inlet particle separators. The separator systems discussed above are particularly effective in separating smaller particles (e.g., 5 microns or smaller). Particle removal is particularly useful in the turbine section in which the higher temperatures associated with fuel efficiency and power production require internal cooling. The separator system may prevent or mitigate the blockage of the small passages of the internal cooling circuits, the associated reduction in cooling air, and the resulting premature distress. As such, exemplary embodiments provide an additional removal, or cleansing, of small particles from the portion of the air used to cool select components. By removing the dust particles from the cooling air, a significant life extension is enabled for propulsion and APU engines that run in a dusty environment, such as helicopter use in a desert environment or fixed wing aircraft that land and take off in the same. Generally, the exemplary embodiments above may be used for any engine cooling system in which air is removed from the mainstream gas flow, cleaned, and directed to a predetermined engine location for cooling. As discussed above, such cooling air is removed from the mainstream gas flow after compression. Although exemplary embodiments are described above with respect to vehicle applications, the exemplary embodiments may also be applied to other applications, such as power generation, mining applications, industrial applications, and the like.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A cooling arrangement for a gas turbine engine with a turbine section, comprising:
    a first conduit to receive cooling air that includes particles;
    a separator system coupled to the first conduit to receive the cooling air and configured to remove at least a portion of the particles to result in relatively clean cooling air and scavenge air including the portion of the particles; and
    a second conduit coupled to the separator system and configured to direct the relatively clean cooling air to the turbine section,
    wherein the separator system includes a first electrostatic tube defined by a wall and forming a flow path for the cooling air, the separator system further including a first electrode extending through the first electrostatic tube, wherein upon application of a voltage, the first electrode creates an ionized flow area within the first electrostatic tube such that the particles flowing through the first electrostatic tube obtain a charge and migrate to the wall of the first electrostatic tube,
    wherein the separator system further includes a collection unit coupled to the first electrostatic tube and configured to remove at least a portion of the charged particles, and
    wherein the collection unit is at least partially a scroll that surrounds the first electrostatic tube.

2. The cooling arrangement of claim 1, wherein the separator system includes a charging unit to apply the charge to the particles of the cooling air.

3. The cooling arrangement of claim 2, wherein the separator system further includes a migration unit and wherein the collection unit is coupled to the charging unit, wherein the migration unit is configured to direct the charged particles to the collection unit.

4. The cooling arrangement of claim 1, wherein the second conduit forms part of a tangential on-board injector (TOBI) system associated with a rotor assembly of the turbine section.

5. The cooling arrangement of claim 1, wherein the second conduit forms part of a stator assembly cooling circuit.

6. An engine assembly, comprising:
    a compressor section configured to receive and compress air;
    a combustion section coupled to the compressor section and configured to combust at least a portion of the compressed air to result in combustion gases;
    a turbine section coupled to the combustion section and configured to receive the combustion gases to generate power; and
    a cooling arrangement configured to direct cooling air to the turbine section, the cooling arrangement including a separator system configured to remove a portion of particles from the cooling air to result in relatively clean cooling air and scavenge air including the portion of the particles,
    wherein the separator system includes a first electrostatic tube for receiving a first portion of the cooling air and a second electrostatic tube for receiving a second portion of the cooling air, wherein the first electrostatic tube is configured to apply a negative charge to particles in the first portion of the cooling air and the second electrostatic tube is configured to apply a positive charge to particles in the second portion of the cooling air,
    wherein the separator system further includes a coalescing unit downstream of the first and second electrostatic tubes to receive the first and second portions of the cooling air such that the negatively charged particles of the first portion of the cooling air aggregate with the positively charged particles of the second portion of the cooling air, wherein the separator system further includes a collection unit coupled to the coalescing unit and configured to remove the aggregated particles to result in the relatively clean cooling air and the scavenge air, and wherein the collection unit includes a swirl collector to provide centrifugal separation of the aggregated particles.

7. The engine assembly of claim 6, wherein the cooling arrangement is coupled to the compressor section to bleed at least a portion of the compressed air as the cooling air.

8. The engine assembly of claim 6, wherein the separator system includes a charging unit to apply the charge to the particles of the cooling air.

9. The engine assembly of claim 8, wherein the separator system further includes a migration unit and wherein the collection unit is coupled to the charging unit, wherein the migration unit is configured to direct the charged particles to the collection unit.

10. The engine assembly of claim 6, wherein the turbine section includes a tangential on-board injector (TOBI) system, and wherein the cooling arrangement provides the relatively clean cooling air to the TOBI system.

11. The engine assembly of claim 6, wherein the turbine section includes a stator assembly, and wherein the cooling arrangement provides the relatively clean cooling air to the stator assembly.

12. An engine assembly, comprising:
a compressor section configured to receive and compress air;
a combustion section coupled to the compressor section and configured to combust at least a portion of the compressed air to result in combustion gases;
a turbine section coupled to the combustion section and configured to receive the combustion gases to generate power; and
a cooling arrangement configured to direct cooling air to the turbine section, the cooling arrangement including a separator system configured to remove a portion of particles from the cooling air to result in relatively clean cooling air and scavenge air including the portion of the particles,
wherein the separator system includes a first electrostatic tube defined by a wall and forming a flow path for the cooling air, the separator system further including a first electrode extending through the first electrostatic tube, wherein upon application of a voltage, the first electrode creates an ionized flow area within the first electrostatic tube such that the particles flowing through the first electrostatic tube obtain a charge and migrate to the wall of the first electrostatic tube,
wherein the separator system further includes a collection unit coupled to the first electrostatic tube and configured to remove at least a portion of the charged particles, and
wherein the collection unit is at least partially a scroll that surrounds the first electrostatic tube.

\* \* \* \* \*